United States Patent [19]

Bieringer et al.

[11] Patent Number: 4,789,715
[45] Date of Patent: Dec. 6, 1988

[54] PROCESS FOR POLYMERIZING VINYL CHLORIDE WITH POLYGLYCOSYL POLYOL ESTERS

[75] Inventors: Heimo Bieringer, Reken; Peter Hofmann, Marl, both of Fed. Rep. of Germany

[73] Assignee: Huels Aktiengesellschaft, Marl, Fed. Rep. of Germany; a part interest

[21] Appl. No.: 920,084

[22] Filed: Oct. 17, 1986

[30] Foreign Application Priority Data

Oct. 17, 1985 [DE] Fed. Rep. of Germany ....... 3536936

[51] Int. Cl.[4] .............................................. C08F 2/20
[52] U.S. Cl. ..................... 526/200; 525/252
[58] Field of Search ........................................ 526/200

[56] References Cited

U.S. PATENT DOCUMENTS

| | | | |
|---|---|---|---|
| 3,817,963 | 6/1974 | Balwe et al. | 526/200 |
| 3,951,945 | 4/1976 | Heesen et al. | 536/18.2 |
| 4,515,928 | 5/1985 | Schwarz | 526/200 |

FOREIGN PATENT DOCUMENTS 977899 11/1975 Canada.
1110397 10/1981 Canada.

OTHER PUBLICATIONS

Kirk-Othmer, "Encyclopedia of Chemical Technology", 2d Ed., vol. 4, p. 133.

*Primary Examiner*—Christopher Henderson
*Attorney, Agent, or Firm*—Millen & White

[57] ABSTRACT

A polyvinyl chloride is produced by suspension polymerization in the presence of two suspension agents, namely
(a) 10–90% by weight, based on the mixture, of a carbohydrate ester of a carbohydrate having the following formula

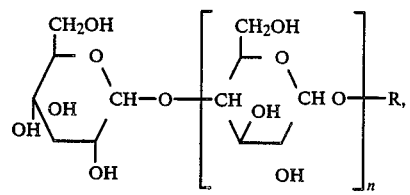

wherein
n is a number of 0 to 99 and
R is the residue of a di- to hexahydric aliphatic, linear or branched alcohol of 2–12 carbon atoms, and a saturated or unsaturated, linear or branched carboxylic acid of 6–24 carbon atoms, as well as of
90–10% by weight, based on the suspension agent mixture, of a specific cellulose ether or a specific partially saponified polyvinyl alcohol.

The resultant polyvinyl chloride exhibits simultaneously the desired properties of very low gel number besides high porosity and high powder density.

13 Claims, No Drawings

PROCESS FOR POLYMERIZING VINYL CHLORIDE WITH POLYGLYCOSYL POLYOL ESTERS

BACKGROUND OF THE INVENTION

In the production of polyvinyl chloride by suspension polymerization, the monomer or monomer mixture is finely distributed in the aqueous phase by mechanical agitation, stabilized with the aid of protective colloids, and polymerized in the presence of radical initiators.

Usable protective colloids or suspension stabilizers are water-soluble, natural, polymeric substances, such as gelatin, water-soluble cellulose derivatives, such as alkyl celluloses, hydroxyalkyl celluloses, and the like, water-soluble synthetic products, such as partially saponified polyvinyl acetates, copolymers of maleic anhydride or vinylpyrrolidone with vinyl acetate, and also various combinations of the aforementioned materials.

In suspension polyvinyl chloride resins produced according to conventional processes, there is a correlation between the porosity and the bulk density of the resin, in that an increase in porosity to achieve satisfactory demonomerization results in a reduction in bulk density. However, a decrease in bulk density means a diminished output of extruded polyvinyl chloride resin. In processing PVC without plasticizer to obtain a hard product, it is desirable to maintain a high bulk density and a maximally high porosity since thereby devolatilizability of the polyvinyl chloride resin is facilitated, the mixing time for introduction of the processing aids and thermostabilizers prior to extrusion is shortened, and the number of gels or fisheyes in the extrudate is reduced.

In order to achieve both high porosity and bulk density, surfactants have been added as porosity-improving agents, such as, for example, sorbitan monolaurate (cf DOS No. 2,208,796, which disclosure is incorporated by reference herein). However, polyvinyl chloride resins produced according to this method exhibit an inadequate bulk density, a reduced extruder output during processing without plasticizer, and a high level of gels in the extrudate.

It has also been known to use, in suspension polymerization of vinyl chloride, polyvinyl alcohols or, respectively, cellulose ethers as primary suspension agents, and high-molecular weight compounds containing nitrogen and oxygen atoms as the cosuspension stabilizers, of DOS 2,234,038, British Pat. No. 991,134, DOS No. 2,653,087, which disclosures are incorporated by reference herein. As can be seen from the comparative tests set forth in the table, these polyvinyl chloride resins show, however, a comparatively low output during extrusion without plasticizers, or a very high level of gels in the extrudate.

SUMMARY OF THE INVENTION

It is an object of the invention to provide a process for the production of polyvinyl chloride by suspension polymerization that enables the production of polyvinyl chloride having maximally high porosity as well as high bulk density of the PVC extrudate.

It is an additional object to provide improved polyvinyl chloride polymers produced by said process, as well as relevant compositions containing said polymers.

It is still an additional object to provide improved suspension agents for use in suspension polymerization of vinyl chloride as well as relevant compositions containing said suspension agents Upon further study of the specification and appended claims, further objects and advantages of this invention will become apparent to those skilled in the art.

These objects have been achieved by providing a process for the production of polyvinyl chloride by polymerization of vinyl chloride in an aqueous suspension in the presence of up to 20% by weight, based on monomers utilized, of copolymerizable monomers, and/or up to 20% by weight, based on monomers utilized, of polymers that can be graft-copolymerized with vinyl chloride, and in the presence of oil-soluble activators which disintegrate radically, and in the presence of a mixture of two or more high-molecular, surface-active suspension agents, as well as optionally in the presence of emulsifiers, buffer compounds, and molecular size regulators, preferably at about 30°-80° C., characterized by using 0.04-1% by weight, based on monomers utilized, of a suspension agent mixture consisting essentially of (a) about 10-90% by weight, based on the mixture of suspension agent, of a carbohydrate ester of a carbohydrate having the following formula:

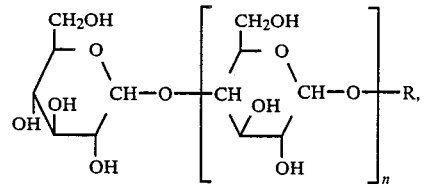

wherein
n is a number from 0 to 99 and
R is a di- to hexahydric aliphatic, linear or branched alcohol of 2-12 carbon atoms, and a saturated or unsaturated, linear or branched carboxylic acid of 6-24 carbon atoms; and (b) about 90-10% by weight, based on the mixture of suspension agent, of a cellulose ether selected from the group consisting of methylcellulose, methylhydroxyethylcellulose, methylhydroxypropylcellulose, hydroxyethylcellulose, hydroxypropylcellulose or aminoethylhydroxypropylcellulose, the 2% by weight aqueous solution of the aforementioned cellulose ethers exhibiting at 20° C. a viscosity of 15-500 $\cdot 10^{-3}$ Pa·s, or of a partially saponified polyvinyl acetate with a hydrolysis degree of 69-90 mol-% and a viscosity of 2-100 mPa·s, measured in a 4% by weight aqueous solution at 20° C. Preferably, component (a) is used in amounts of 20-80% by weight, based on the suspension agent mixture.

A polyvinyl chloride resin having especially advantageous properties is obtained with suspension agent mixtures containing as component (b) a partially saponified polyvinyl acetate with a hydrolysis degree of 69-75 mol-%, and containing 80-20% by weight, especially 70-30% by weight, of component (b).

The carbohydrate ester to be employed as component (a) can be prepared, for example, in accordance with DOS No. 2,423,278, which disclosure is incorporated by reference herein.

The basic carbohydrate is built up of aglycone and carbohydrate residue. The carbohydrate residue contains 1-100, preferably 1-50, more preferably 1-15 anhydroglycose units which can be linked to one another in the alpha- and/or beta-glycoside fashion. The carbohydrate residue can exhibit a unitary molecular structure, but preferably it presents a mixture of carbohydrate and a varying number of anhydroglycose units.

The aglycone R-OH can be a di- to hexavalent aliphatic, linear or branched alcohol of 2-12 carbon atoms. Examples include: ethylene glycol, 1,2-propylene glycol, 1,3-propylene glycol, 1,2-butylene glycol, 1,4-butanediol, 1,6-hexanediol, glycerol, trimethylolpropane, erythritol, pentaerythritol, pentitols, such as, e.g., arabitol, xylitol, hexitols, such as, for example, sorbitol, mannitol, dulcitol.

The carbohydrate, composed of aglycone and anhydroglycose units, can be esterified with saturated or unsaturated, linear or branched aliphatic carboxylic acids or carboxylic acid mixtures containing 6-24 carbon atoms.

Esterification with R-COOH takes place as on the OH-groups of the aglycone, e.g. sorbite, as on the OH-groups of the carbohydrate residue, e g. glucose.

Examples of such carboxylic acids include: caproic acid, caprylic acid, capric acid, lauric acid, myristic acid, palmitic acid, stearic acid, arachic acid, behenic acid, lignoceric acid, palmitoleic acid, oleic acid, elaidic acid, linolic acid, linolenic acid, ricinoleic acid, or mixtures corresponding to the natural triglycerides thereof, such as, for example, rapeseed oil fatty acid, tall oil fatty acid, coconut fatty acid, soybea oil fatty acid, castor oil fatty acid, palm kernel oil fatty acid, palm oil fatty acid, peanut oil fatty acid, cottonseed oil fatty acid, sunflower oil fatty acid, linseed oil fatty acid, tallow fatty acid, fish oil fatty acid.

The molar quantity of fatty acids present in the carbohydrate ester is at least 1 mole, based on the carbohydrate, preferably 0.5-2 moles per anhydroglycose unit, and is limited in the upward direction by the total number of OH-groups available in the aglycone and in the anhydroglycose units, i.e., in the entire carbohydrate.

The carbohydrate esters described as component (a) of the suspension agent mixture are prepared, for example, in accordance with DOS No. 2,423,278, which disclosure is incorporated by reference herein.

Components (a) and (b) of the suspension agent mixture are added to the polymerization liquid generally as aqueous solutions. The latter can contain, to improve solubility of the corresponding suspension agent, water-miscible aliphatic alcohols, aliphatic ketones, or aliphatic carboxylic acid esters, in an amount of 10-100% by weight, based on suspension agents.

The weight percentages of the suspension agent components (a) and (b) indicated in the claims add up, in each case, to 100% by weight.

The entire suspension agent mixture is utilized in a quantity of about 0.04-1% by weight, based on monomers employed. With a quantity added of above 1% by weight, the resultant polymer becomes increasingly fine-granular; difficulties are encountered by dust formation during processing of the dry polymer powder; pourability and powder density decrease. With the use of less than 0.04% by weight of suspension agent mixture, there is an increasing amount of coarse proportions and agglomerates of polymer grains; the thus-produced polymer suspensions become unstable which can even lead to block formation in the polymerization reactor. Preferably, the suspension agent mixture is utilized in amounts of 0.06-0.3% by weight, especially 0.07-0.2% by weight, based on the monomers employed.

The process of this invention is suitable for the polymerization of vinyl chloride in the aqueous phase in the presence of about 0-20% by weight, based on monomers utilized, of monomers copolymerizable with vinyl chloride, good results being obtained in the presence of 0.1-10% by weight, preferably 1-9% by weight, of copolymerizable monomers.

One or several of the following monomers are suitable, for example, for copolymerization with vinyl chloride: olefins, such as ethylene or propylene, vinyl esters of straight-chain or branched carboxylic acids of 2-20, preferably 2-4 carbon atoms, such as vinyl acetate, propionate, butyrate, 2-ethylhexoate, vinyl isotridecanoic acid esters; vinyl halogenides, such as vinyl fluoride, vinylidene fluoride, vinylidene chloride, vinyl ethers, vinylpyridine, unsaturated acids, such as maleic, fumaric, acrylic, methacrylic acid, and their mono- or diesters with mono- or dialcohols of 1-10 carbon atoms; maleic anhydride; maleic imide, as well as its N-substitution products with aromatic cycloaliphatic, as well as optionally branched, aliphatic substituents; acrylonitrile, styrene.

Copolymerization in the presence of the suspension agent disclosed herein takes place according to the monograph oF H. Kainer, "Polyvinylchlorid und Vinylchlorid-Mischpolymerisate", pringer publishers, Berlin/Heidelberg/New York, 1965 page 76 to 110 which disclosure is incorporated by reference herein.

Especially good results are also achieved by homopolymerization of vinyl chloride. Homopolymerization processes are disclosed in, e.q., in the above mentioned monograph of Kainer, page 12 to 34, which disclosure is incorporated by reference herein. The prooess can also be used for graft copolymerization of vinyl chloride; besides vinyl chloride, stlll other oopolymerizable monomers can be present in this case.

Crosslinked or uncrosslinked elastomerio polymers can be utilized for the graft copolymerization, for example, as they are obtained by polymerization of one or several of the following monomers: dienes, such as butadiene, cyclopentadiene; olefins, such as ethylene, propylene; styrene, unsaturated acids, such as acrylic or methacrylic acid, as well as their esters with mono- or dialcohols of 1-10 carbon atoms, acrylonitrile, vinyl compounds, such as vinyl esters of straight-chain or branched carboxylic acids of 2-20, preferably 2-4 carbon atoms, vinyl halogenides, such as vinylidene chloride and vinyl chloride, however, the latter only with at least one of the previously mentioned monomers. The amounts of polymers graft-copolymerizable with vinyl chloride which are used are about 0.1-20% by weight, preferably 1-15% by weight. Typical graft polymerization processes are disclosed in the above mentioned monograph of Kainer, page 111 to 114, which disclosure is incorporated by reference herein.

The production of the vinyl chloride homo-, co- or graft copolymers can take place according to continuous or batchwise polymerization processes, with or without the use of a seed prepolymer. The process is carried out in an aqueous suspension in the presence of 0.001-3% by weight, preferably 0.01-0.3% by weight, based on monomers, of radical-forming catalysts, e.g., diaryl, diacyl peroxides, such as diacetyl, acetylbenzoyl, dilauroyl, dibenzoyl, bis-2,4-dichlorobenzoyl, bis-2-methylbenzoyl peroxide; dialkyl peroxides, such as di-tert-butyl peroxide, peresters, such as tert-butyl percarbonate, tertbutyl peracetate, tert-butyl peroctoate, tert-butyl perpivalate; dialkyl peroxydicarbonates, such as diisopropyl-, diethylhexyl-, dicyclohexyl-, diethylcyclohexyl-peroxydicarbonate; mixed anhydrides of organic sulfoperacids and organic acids, such as acetylcyclohexylsulfonylperoxide; azo compounds known to be polymerization catalysts, such as azobisisobutyronitrile; furthermore optionally additives of persulfates, such as potassium, sodium or ammonium persulfate, hydrogen peroxide, tert-butyl hydroperoxide, or other water-soluble peroxides, as well as mixtures of various catalysts; in this connection, peroxidic catalysts can also be utilized in the presence of 0.01–1% by weight, based on monomers, of one or several reducing compounds suitable for building up a redox catalyst system, such as, for example, sulfites, bisulfites, dithionites, thiosulfates, aldehyde sulfoxylates, for example sodium formaldehyde sulfoxylate.

Furthermore, the polymerization can be performed in the presence of about 0.01–1% by weight, based on monomers, of one or several nonionic emulsifiers, wherein the emulsifiers can be utilized by themselves for preemulsifying the monomers, as well as in the actual polymerization in a mixture with the aforedescribed suspension agents.

Examples for nonionic emulsifiers are: polyoxyethylene esters of fatty acids, as well as polypropylene oxide-polyethylene oxide condensation products.

The polymerization can be conducted, besides being performed in the presence of catalysts, the suspension agent mixtures according to this invention, and optionally emulsifiers, also in the presence of buffer compounds, for example alkali acetates, borax; alkali carbonates, alkali phosphates, ammonia or ammonium salts of carboxylic acids, as well as in the presence of molecular size regulators, such as, for example, aliphatic aldehydes of 2–4 carbon atoms, chlorinated or brominated hydrocarbons, such as, for example, di- and trichloroethylene, chloroform, bromoform, methylene chloride, as well as mercaptans. Examples for further suitable polymerization aids can be found in H. Kainer, "Polyvinylchlorid und Vinylchlorid-Mischpolymerisate" [Polyvinyl Chloride and Vinyl Chloride Copolymers], 1965 edition, pp. 13–34.

The polymerizations are to be carried out at temperatures of 3°14 80°, preferably at 45°–75° C.; the polymerizations can be optionally conducted with the use of a reflux condenser, two or more agitating speeds and/or temperature stages. The pH value of the polymerization liquid should range between about 2 and about 10.

During polymerization, one or several of the following compounds can be added, optionally while maintaining the filled-in volume of the polymerization vessel at a constant value: water, aqueous solutions, monomers, catalysts, cocatalysts, further polymerizing aids, such as, for example, regulators, buffer compounds, emulsifiers, suspension agents.

Polymers produced in accordance with this invention can be freed of residual monomers, particularly vinyl chloride, by means of conventional methods as disclosed in Ullmann, Encyclopädie der technischen Chemie, 4. Auflage, Band 19, S. 347 unter Umwelt und Arbeitsschutz, which disolosure is incorporated by reference herein, in an aqueous dispersion as well as a watermoist cake or in the pulverulent, moist or dry condition.

Working up of the aqueous polymer dispersion to the dry powder likewise takes plaoe aooording to known methods, for example by decanting of the primary quantity of the aqueous phase in a decanting centrifuge and drying of the thus-obtained water-moist cake in a flash dryer or fluidized-bed dryer. Only traces of the suspension stabilizers remain on the polymer particles. Thus-obtained, powdery polymers can be processed as thermoplastics just as heretofore conventional suspension polymers of vinyl chloride, for example by extrusion, injection molding or calendering.

On account of the favorable combination of properties displayed by the polymers produced according to this invention as regards powder density, plasticizer absorption, particle size distribution, and low tendency toward the formation of fisheyes (gels), the polymers are especially suitable for processing operations which are to produce, with high output, high-quality, especially glass-clear, optically flawless articles.

In the examples set forth below, sorbitol was utilized as the aglycone.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

COMPARATIVE EXAMPLE 1

(as In DOS No. 2,234,038)

A 40-liter stainless steel polymerization autoclave was charged with the following ingredients: 20,000 parts of water, 20 parts of hydroxyethylcellulose, 250 mPa·s, trade name "Natrosol" 250 K (Hercules Inc., Wilmington, U.S.A.), 4.8 parts of aminoethylhydroxypropylcellulose, 150 mPa·s (trade name "Klucel" 6G, Hercules Inc., Wilmington, U.S.A.), and 6 parts of dicetylperoxydicarbonate. The autoclave was sealed, purged with nitrogen, evacuated, and subsequently charged with 10,000 parts of vinyl chloride. Polymerization was performed at 54° C. up to a pressure of 5 bar. The product was then separated from the largest portion of the suspension water and dried at 50° C. in a fluidized-bed dryer.

The product results in finished parts having many gels (Table 2).

COMPARATIVE EXAMPLE 2

(as in British Pat. No. 991,134)

A 40-liter stainless steel polymerization autoclave was charged with the following ingredients: 20,000 parts of water, 10 parts of a partially saponified polyvinyl acetate having a degree of hydrolysis of 88 mol-% and a viscosity of 27 mPa·s, measured in a 4% aqueous solution at 20° C. according to Hoeppler, 10 parts of poly(N-vinylpyrrolidone) ("Luviskol"K 90 of BASF AG, Ludwigshafen), 10 parts of lauroyl peroxide, and 7.5 parts of sodium carbonate. The autoclave was sealed, purged with nitrogen, evacuated, and subsequently charged with 10,000 parts of vinyl chloride. Polymerization was conducted at 54° C. up to a pressure of 5 bar. The product was thereafter separated from the largest part of the suspension water and dried at 50° C. in a fluidized-bed dryer.

The product leads to finished parts having an extremely high number of gels (Table 2).

COMPARATIVE EXAMPLE 3

(as in DOS No. 2,653,087)

A 40-liter stainless steel polymerization autoclave was charged with the following ingredients: 20,000 parts of water, 5 parts of a partially saponified polyvinyl acetate with a hydrolysis degree of 70 mol-% and a viscosity of 5 mPa·s, measured in a 4% aqueous solution at 20° C. according to Hoeppler; as a cosuspension agent 2 parts of a partially saponified polyvinyl acetate having a hydrolysis degree of about 50 mol-% ("Polivic"S 202 of Sigma Italiana Prodotti Chimici S.p.A., Bergamo); 10 parts of lauroyl peroxide and 5 parts of ammonium bicarbonate. The autoclave was sealed, purged with nitrogen, evacuated, and subsequently charged with 10,000 parts of vinyl chloride. Polymerization was carried out at 56° C. up to a pressure of 5 bar. The product was then separated from the largest part of the suspension water and dried at 50° C. in a fluidized-bed dryer.

The product exhibits a low bulk density and consequently reduced output during extrusion without plasticizer (Table 2).

COMPARATIVE EXAMPLE 4

(as in DOS No. 2,208,796)

The process was performed as in Comparative Example 3, but using 3 parts of sorbitan monolaurate as the cosuspension agent.

This product likewise shows reduced output during extrusion without plasticizer (Table 2).

COMPARATIVE EXAMPLE 5

The procedure of Example 1 was carried out, but omitting the carbohydrate ester according to this invention.

The product has a very coarse grain, results in reduced output in extrusion without plasticizer, and the finished articles show many gels (Table 2).

EXAMPLES 1–5

A 40-liter stainless steel polymerization autoclave was charged with the following ingredients: 20,000 parts of water, 5 parts of a partially saponified polyvinyl acetate having a hydrolysis degree of 70 mol-% and a viscosity of 5 mPa·s. measured in a 4% aqueous solution at 20° C., 2 parts of a polyglycosyl polyol ester having the structural features indicated in Table 1, 10 parts of lauroyl peroxide, and 5 parts of ammonium bicarbonate.

The autoclave was sealed, purged with nitrogen, evacuated, and then charged with 10,000 parts of vinyl chloride. Polymerization was performed at 56° C. up to a pressure of 5 bar. The product was subsequently freed of the largest portion of the suspension water and dried at 50° C. in a fluidized-bed dryer.

The products prepared according to this process show high output during extrusion without plasticizer and lead, in this procedure, to finished parts having a low gel number (cf. Table 2).

EXAMPLES 6–10

A 40-liter stainless steel polymerization autoclave was charged with the following components: 20,000 parts of water, 9 parts of a partially saponified polyvinyl acetate having a degree of hydrolysis of 70 mol-% and a viscosity of 5 mPa·s, measured in a 4% aqueous solution at 20° C., 20 parts of a polyglycosyl polyol ester having the structural features set forth in Table 1, 9 parts of lauroyl peroxide, 9 parts of dicetylperoxodicarbonate, and 4 parts of ammonium bicarbonate. The autoclave was sealed, purged with nitrogen, evacuated, and then charged with 10,000 parts of vinyl chloride. Polymerization was conducted at 54° C. up to a pressure of 5 bar. The product was subsequently separated from the largest part of the suspension water and dried at 50° C. in a fluidized-bed dryer.

The products prepared according to this process (Table 3) are excellently suited, on account of their high porosity, for processing with plasticizers of high viscosity. The resultant finished parts show a low gel number.

TABLE 1

Structural Summary of Polyglycosyl Polyol Esters

| Structural Type | Average Number n of Anhydroglycose Units of the Carbohydrate Residue | Type of Carboxylic Acid Residue | Molar Ratio of Anhydroglycose to Carboxylic Acid |
|---|---|---|---|
| A | 12 | Rapeseed oil fatty acid residue | 3:1 |
| B | 12 | Rapeseed oil fatty acid residue | 1:1 |
| C | 2 | Tall oil fatty acid residue | 1:1 |
| D | 2 | Coconut oil fatty acid residue | 1:1 |
| E | 2 | Rapeseed oil fatty acid residue | 1:1 |
| F | 2 | Soybean oil fatty acid residue | 1:1 |

TABLE 2

| | Structural Type of Polyglycosyl Polyol Ester Corresponding to Table 1 | Particle Size Distribution Retained in % by Weight on Sieve Sizes | | | | Bulk Density[1] (g/l) | Plasticizer Absorption[3] (g DOP[2] / 100 g PVC) | Gel Content Rolled Film[6] (Gels per 20 cm²) | Extruder Output[7] (kg/h) |
|---|---|---|---|---|---|---|---|---|---|
| | | 63 μm | 100 μm | 200 μm | 250 μm | | | | |
| Example 1 | A | 99 | 97 | 2 | — | 555 | 21 | 21 | 11.1 |

TABLE 2-continued

| | Structural Type of Polyglycosyl Polyol Ester Corresponding to Table 1 | Particle Size Distribution Retained in % by Weight on Sieve Sizes | | | | Bulk Density[1] (g/l) | Plasticizer Absorption[3] $\left[\frac{\text{g DOP}^{(2)}}{100 \text{ g PVC}}\right]$ | Gel Content Rolled Film[6] (Gels per 20 cm$^2$) | Extruder Output[7] (kg/h) |
|---|---|---|---|---|---|---|---|---|---|
| | | 63 μm | 100 μm | 200 μm | 250 μm | | | | |
| Example 2 | C | 99 | 98 | 17 | 0.5 | 540 | 24 | 12 | 10.2 |
| Example 3 | D | 99 | 97 | 1 | — | 552 | 27 | 5 | 11.0 |
| Example 4 | E | 99 | 98 | 28 | 1 | 543 | 26 | 1 | 10.2 |
| Example 5 | F | 99 | 96 | 1 | — | 542 | 24 | 14 | 10.3 |
| Comp. Ex. 1 | — | 98 | 84 | 9 | 0.5 | 558 | 20 | 74 | 10.8 |
| Comp. Ex. 2 | — | 74 | 37 | 11 | — | 603 | 11 | >500 | 12.0 |
| Comp. Ex. 3 | — | 98 | 93 | 1 | — | 468 | 26 | 36 | 8.5 |
| Comp. Ex. 4 | — | 99 | 94 | 3 | — | 485 | 22 | 46 | 8.7 |
| Comp. Ex. 5 | — | 99 | 96 | 44 | 30 | 520 | 23 | 170 | 9.6 |

TABLE 3

| | Structural Type of Polyglycosyl Polyol Ester Corresponding to Table 1 | Particle Size Distribution Retained in % by Weight on Sieve Sizes | | | | Bulk Density[1] (g/l) | Plasticizer Absorption[3] $\left[\frac{\text{g DOP}^{(2)}}{100 \text{ g PVC}}\right]$ | Time of Plasticizer Absorption[4] (min) | Evaluation of Fisheyes[5] |
|---|---|---|---|---|---|---|---|---|---|
| | | 63 μm | 100 μm | 160 μm | 200 μm | | | | |
| Example 6 | A | 94 | 70 | 3 | — | 468 | 39 | 4.5 | 3.9 |
| Example 7 | B | 99 | 89 | 3.5 | 0.5 | 490 | 30 | 5.2 | 4.6 |
| Example 8 | C | 99 | 89 | 1.5 | — | 435 | 43 | 4.2 | 3.1 |
| Example 9 | D | 99 | 97 | 16 | 1 | 456 | 42 | 4.6 | 3.0 |
| Example 10 | E | 97 | 94 | 8 | — | 475 | 33 | 4.8 | 4.2 |

[1]According to DIN 53 468.
[2]DOP = di(2-ethylhexyl) phthalate.
[3]According to DIN 53 417/1 (centrifuging method)—being a measure for grain porosity.
[4]Time period up to the drying point of a PVC:di-(2-ethylhexyl) phthalate = 60:40 mixture, measured in a Brabender planetary mixer at 85° C.
[5]Testing method with a high-viscosity polymeric adipic acid ester as the plasticizer. Comparison with standard samples, 6 being an extremely high number, 3.5 being a medium number, and 1 being an extremely low number of fisheyes. The numbers in between are corresponding intermediate stages. The indicated values are averaged from several evaluations of blown films extruded at three different screw speeds. Testing formulation: 70 parts of PVC, 30 parts of "Witamol" 621, 4 parts of "Nuostab" V 1204, 0.2 part of "LOXIOL" G 40
[6]According to the rules of the Leuchs testing experiment, a rolled sheet is produced from a polyvinyl chloride-plasticizer-carbon black mixture; this sheet is taken off in a defined thickness after a predetermined time period. The ungelled, light-colored particles are counted out in an area of a defined size. The indicated values are averaged from several counted quantities.
[7]A mixture, consisting of: 100 parts by weight of PVC, 2 parts by weight of lead stabilizer ("Bärospan" SMS 302, Chem. Fabrik Otto Bärlocher, Munich), 1 part by weight of calcium carbonate is extruded on a twin-screw extruder (400 mm screw length, conical section) into pipes having a diameter of 32 mm and a wall thickness of 1.8 mm. At a constant screw speed of 30 min$^{-1}$, the amount of extrudate put out during a period of 30 minutes is determined by gravimetry and converted to kg/h.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of polyvinyl chloride by polymerization of vinyl chloride in an aqueous suspension in the presence of a mixture of two or more high-molecular weight surface-active agent mixture consists essentially of:
   (a) 10–90% by weight, based on the mixture of suspension agent, of an ester of a saturated or unsaturated, linear or branched carboxylic acid of 6–24 carbon atoms or a mixture thereof, and a carbohydrate having the following formula:

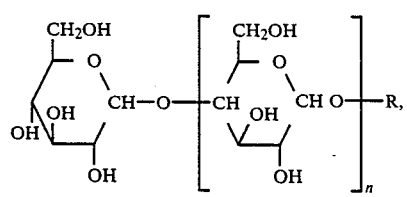

HUELS 667 wherein
n is a number from 0 to 49 inclusive and
R is a residue of a di- to hexahydric aliphatic, linear or branched alcohol of 2–12 carbon atoms; and
   (b) 90–10% by weight, based on the mixture of suspension agent, of a cellulose ether selected from the group consisting of methylcellulose, methylhydroxyethylcellulose, methylhydroxypropylcellulose, hydroxyethylcellulose, hydroxypropylcellulose or aminoethylhydroxypropylcellulose, the 2% by weight aqueous solution of the aforementioned cellulose ethers exhibiting at 20° C. a viscosity of 15–50 10$^{-3}$ Pa·s, or a partially saponified polyvinyl acetate with a hydrolysis degree of 69–90 mol-% and a viscosity of 2–100 mPa(s), measured in a 4% by weight aqueous solution, at 20° C.

2. A process according to claim 1, wherein the polymerization is conducted in the presence of an oil soluble activator which disintegrates radically.

3. A process according to claim 1, wherein the carbohydrate to be esterified contains 1–15 anhydroglycose units.

4. A process according to claim 1, wherein R is ethylene glycol, 1,2-propylene glycol, 1,3-propylene glycol, 1,2-butylene glycol, 1,4-butanediol, 1,6-hexanediol, glycerol, trimethylolpropane, erythritol, pentaerythritol, arabitol, xylitol, sorbitol, mannitol or dulcitol.

5. A process according to claim 1, wherein the carboxylic acid is caproic acid, caprylic acid, capric acid, lauric acid, myristic acid, palmitic acid, stearic acid, arachic acid, behenic acid, lignoceric acid, palmitoleic acid, oleic acid, elaidic acid, linolic acid, linolenic acid, ricinoleic acid, rapeseed oil fatty acid, tall oil fatty acid, coconut oil fatty acid, soybean oil fatty acid, castor oil fatty acid, palm kernel oil fatty acid, palm oil fatty acid, peanut oil fatty acid, cottonseed oil fatty acid, sunflower oil fatty acid, linseed oil fatty acid, tallow fatty acid, fish oil fatty acid, or a mixture thereof.

6. A process according to claim 5, wherein the carboxylic acid is rapeseed oil fatty acid, tall oil fatty acid, coconut oil fatty acid or soybean oil fatty acid.

7. A process according to claim 1, wherein vinyl chloride is copolymerized in the presence of not more than 20% by weight, based on monomers used, of a copolymerizable monomer.

8. A process according to claim 7, wherein the copolymerizable monomer is an olefin, a vinyl ester of a straight-chain or branched carboxylic acid; a vinyl halide; a vinyl ether; vinyl pyridine; malic acid; fumaric acid; acrylic acid; methacrylic acid; a mono- or di-ester of malic, fumaric, acrylic or methacrylic acid with a mono- or dialcohol of 1-10 carbon atoms; maleic anhydride; maleic imide; acrylonitrile or styrene.

9. A process according to claim 1, wherein the polymerization is conducted in the presence of a catalyst, an emulsifier, a buffer compound or a molecular size regulator.

10. A process according to claim 1, wherein 0.04-1% by weight, based on monomers used, of the suspension agent mixture is used.

11. A process according to claim 1, wherein a 2% by weight aqueous solution of the cellulose ethers, based on monomers used, has a viscosity at 20° C. of $15-500 \times 10^{-3}$ Pa(s).

12. A process according to claim 1, wherein component (b) is a partially saponified polyvinyl acetate having a degree of hydrolysis of 69-75 molar percent.

13. A process according to claim 1, wherein 2-80% by weight of component (a) and 80-20% by weight of component (b) are used.

* * * * *